US011330235B2

(12) United States Patent
Zhu et al.

(10) Patent No.: US 11,330,235 B2
(45) Date of Patent: May 10, 2022

(54) PROJECTION METHOD AND PROJECTION DEVICE

(71) Applicant: GOERTEK INC., Shandong (CN)

(72) Inventors: Jian Zhu, Weifang (CN); Xiangdong Zhang, Weifang (CN); Zhenyu Yu, Weifang (CN); Zhiping Luo, Weifang (CN); Dong Yan, Weifang (CN)

(73) Assignee: GOERTEK INC., Weifang (CN)

( * ) Notice: Subject to any disclaimer, the term of this patent is extended or adjusted under 35 U.S.C. 154(b) by 455 days.

(21) Appl. No.: 16/343,293

(22) PCT Filed: May 25, 2018

(86) PCT No.: PCT/CN2018/088525
§ 371 (c)(1),
(2) Date: Apr. 18, 2019

(87) PCT Pub. No.: WO2019/114197
PCT Pub. Date: Jun. 20, 2019

(65) Prior Publication Data
US 2021/0329203 A1 Oct. 21, 2021

(30) Foreign Application Priority Data
Dec. 13, 2017 (CN) .......................... 201711329421.9

(51) Int. Cl.
*H04N 9/31* (2006.01)
*H04N 9/802* (2006.01)

(52) U.S. Cl.
CPC ........... *H04N 9/3185* (2013.01); *H04N 9/802* (2013.01)

(58) Field of Classification Search
CPC .. G06K 9/627; G06K 9/00281; G06K 9/3233; A61B 5/163; G03B 21/142;
(Continued)

(56) References Cited

U.S. PATENT DOCUMENTS 9,253,457 B2  2/2016  Okaniwa
10,216,469 B2 * 2/2019  Kang ..................... G06F 3/16
(Continued)

FOREIGN PATENT DOCUMENTS

CN         1445987 A    10/2003
CN       103813119 A     5/2014
(Continued)

OTHER PUBLICATIONS

CN Office Action dated Feb. 3, 2019 as received in Application No. 201711329421.9.

*Primary Examiner* — Paulos M Natnael
(74) *Attorney, Agent, or Firm* — Maschoff Brennan

(57) ABSTRACT

The disclosure provides a projection method and projection device. The method comprises: acquiring a sound signal sent by a user; performing locating to determine a positional relationship between the user and the projection device according to the sound signal sent by the user; determining a projected image orientation meeting viewing requirements of the user according to the positional relationship between the user and the projection device; and projecting an image to be projected onto a projection plane according to the projected image orientation. By use of the projection method provided by the disclosure, the projected image orientation may be automatically adjusted according to the viewing requirements of the user, and convenience and friendliness for human-computer interaction may be improved.

16 Claims, 8 Drawing Sheets

(58) Field of Classification Search
CPC ...... G03B 29/00; H04N 9/3185; H04N 9/802;
H04N 9/3194; H04N 9/31; H04N 9/3179;
G01S 5/18
See application file for complete search history.

(56) References Cited

U.S. PATENT DOCUMENTS

| | | | |
|---|---|---|---|
| 2003/0223048 A1 | 12/2003 | Kimura | |
| 2007/0249396 A1* | 10/2007 | Nitta | H04M 1/0272 |
| | | | 455/556.1 |
| 2007/0263176 A1* | 11/2007 | Nozaki | G03B 21/142 |
| | | | 353/69 |
| 2009/0002391 A1* | 1/2009 | Williamson | G06F 3/04845 |
| | | | 345/619 |
| 2014/0267091 A1* | 9/2014 | Kim | G06F 3/041 |
| | | | 345/173 |
| 2014/0298246 A1* | 10/2014 | Wang | G06F 3/0488 |
| | | | 715/781 |
| 2015/0123889 A1* | 5/2015 | Willis | G06F 3/011 |
| | | | 345/156 |
| 2015/0237293 A1 | 8/2015 | Fukuda et al. | |
| 2016/0313963 A1 | 10/2016 | Kang et al. | |
| 2019/0026589 A1* | 1/2019 | Sugihara | G06K 9/3241 |

FOREIGN PATENT DOCUMENTS

| | | |
|---|---|---|
| CN | 104601916 A | 5/2015 |
| CN | 105791785 A | 7/2016 |
| CN | 106066758 A | 11/2016 |
| CN | 106647821 A | 5/2017 |
| CN | 107024825 A | 8/2017 |
| CN | 107065409 A | 8/2017 |
| CN | 107329526 A | 11/2017 |
| CN | 107995478 A | 5/2018 |

* cited by examiner

PROJECTION METHOD AND PROJECTION DEVICE

CROSS-REFERENCE TO RELATED APPLICATION

The disclosure cites the Chinese Patent Application No. 2017113294219, filed on Dec. 13, 2017 and entitled "Projection Method and Projection Device", the contents of which are hereby incorporated by reference in its entirety.

TECHNICAL FIELD

The disclosure relates to the technical field of image display, and particularly relates to a projection method and projection device.

BACKGROUND ART

Generally, a projector vertically projects a beam on a desktop or a curtain by use of a vertical projection technology to form an image for a user to view. For achieving vertical projection, it is required to adjust the position of the desktop, the curtain or the projector, which results in relatively low projection efficiency. An oblique projection technology emerges at this moment.

With the oblique projection technology, projector may project a beam on a plane, such as a desktop, at any projection angle to form an image without the coordination of the desktop or a curtain, so as to achieve a broader application prospect. However, when the image is projected onto the desktop by use of the oblique projection technology, a display direction of the projected image may usually not meet viewing requirements of a user. Therefore, the user needs to adjust the viewing position, for example the user has to go to the back of the projector to view a normal projected image, thereby bringing about relatively poor convenience and friendliness for human-computer interaction.

SUMMARY OF THE INVENTION

The disclosure provides a projection method and projection device, which may automatically adjust an orientation of a projected image according to viewing requirements of a user and improve convenience and friendliness for human-computer interaction.

According to one aspect of the disclosure, a projection method is provided, which is applicable to a projection device and comprises:

acquiring a sound signal sent by a user;

performing locating to determine a positional relationship between the user and the projection device according to the sound signal sent by the user;

determining a projected image orientation meeting viewing requirements of the user according to the positional relationship between the user and the projection device; and projecting an image to be projected onto a projection plane according to the projected image orientation.

According to the other aspect of the disclosure, a projection device is further provided, which comprises a projection module, a microphone array, a memory and a processor;

wherein the microphone array is configured to acquire a sound signal sent by a user, perform locating to determine a positional relationship between the user and the projection device according to the sound signal sent by the user, and output the positional relationship to the processor;

the memory is configured to store a computer program; and the processor is coupled to the memory and the microphone array, and configured to execute the computer program to:

determine a projected image orientation meeting viewing requirements of the user according to the positional relationship, output by the microphone array, between the user and the projection device; and control the projection module to project an image to be projected onto a projection plane according to the projected image orientation.

In embodiments of the disclosure, the sound signal sent by the user is acquired, and locating is automatically performed to determine the positional relationship between the user and the projection device according to the sound signal sent by the user; and the projected image orientation meeting the viewing requirements of the user is determined according to the positional relationship between the user and the projection device, and the image to be projected is projected onto the projection plane according to the projected image orientation. In such a manner, the projection device may automatically locate the user and automatically adjust the projected image orientation according to the position of the user, to meet the viewing requirements of the user. The user may view an upright projected image meeting the viewing requirements only by sending the sound signal, so that convenience and friendliness for human-computer interaction are improved.

BRIEF DESCRIPTION OF THE DRAWINGS

The drawings described herein are provided for further understanding the disclosure and as a part of the disclosure. The exemplary embodiments of the disclosure and description thereof serve to explain the disclosure and do not constitute any improper limitation to the disclosure. In the drawings.

DETAILED DESCRIPTION OF THE EMBODIMENTS

For making objects, technical solutions and advantages of the present application more obvious, clear and complete descriptions will be made to the technical solutions of the disclosure below in combination with specific embodiments and corresponding drawings of the disclosure. Obviously, the described embodiments are merely a part of the embodiments of the disclosure but not all embodiments. Based on the embodiments of the disclosure, all other embodiments obtained by those of ordinary skilled in the art without creative work fall within the scope of protection of the disclosure.

In the prior art, when an image is projected onto a projection plane by use of an oblique projection technology, a display direction of the projected image on the projection plane, i.e. a projected image orientation, may not be adjusted according to viewing requirements of a user. In order to solve such a technical problem, the disclosure provides a projection device and a projection method applied to the projection device, wherein a microphone array configured for sound source localization is mounted on the projection device, and on such a basis, the projection device may acquire a sound signal sent by the user through the microphone array thereon, perform locating to determine a positional relationship between the user and the projection device according to the sound signal sent by the user, further determine a projected image orientation meeting the viewing requirements of the user according to the positional relationship and project an image to be projected onto a projection plane according to the projected image orientation. In such a manner, the projection device may automatically locate the user and automatically adjust the projected image orientation according to the position of the user to meet the viewing requirements of the user and improve convenience and friendliness for human-computer interaction.

The technical solutions provided by each embodiment of the disclosure will be described below in combination with the drawings in detail.

Figure 1:
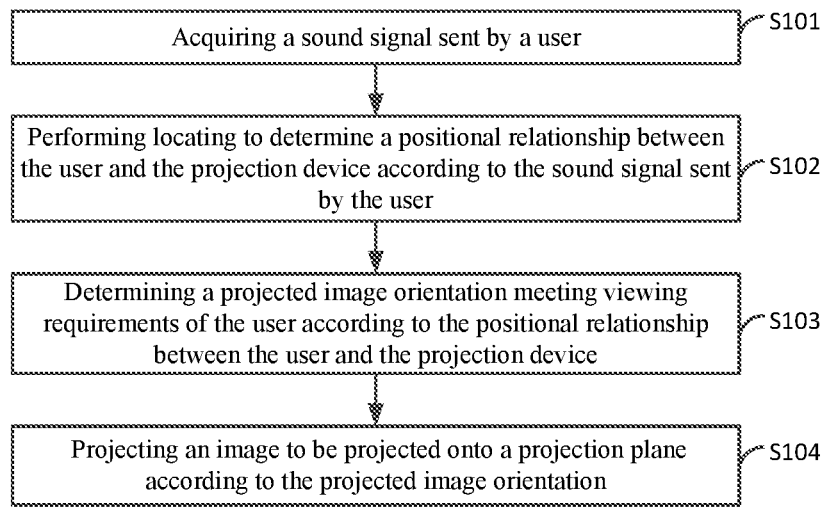
FIG. 1 is a flowchart of a projection method according to an embodiment of the disclosure.

FIG. 1 is a flowchart of a projection method according to an embodiment of the disclosure. The projection method is applicable to projection device. As shown in FIG. 1, the method comprises the following steps:

S101, acquiring a sound signal sent by a user;

S102, performing locating to determine a positional relationship between the user and the projection device according to the sound signal sent by the user;

S103, determining a projected image orientation meeting viewing requirements of the user according to the positional relationship between the user and the projection device; and S104, projecting an image to be projected onto a projection plane according to the projected image orientation.

The method provided by the embodiment is applicable to various projection scenes, for example, a vertical projection scene where a beam midline direction of the projection device is vertical to the projection plane, an oblique projection scene where the image to be projected is projected onto the projection plane, which is not vertical to the beam midline direction of the projection device, by use of an oblique projection technology, and the like scene. The image to be projected may be an image need to be projected, which is received by the projection device from terminal device, and may also be an image need to be projected, which is stored in the projection device; and the projection plane may be a plane capable of implementing imaging, such as the ground and a desktop.

In the application scene where the image to be projected is projected onto the projection plane by use of the oblique projection technology, the user may view the projected image at any position around the projection device or the projection plane. However, according to optical projection principles, the projected image orientation is the front of the projection device, i.e. when the user stands in front of the projection device, a viewing direction of the user is consistent with the projected image orientation, and the user may view an upright projected image, i.e. a picture and text on the projected image are upright. In most cases, the user is not in front of the projection device due to walking or other reasons, the viewing direction of the user is inconsistent with the projected image orientation, and thus the user may view an oblique and even inverted projected image.

If the viewing direction of the user is inconsistent with the projected image orientation, it is necessary to adjust the projected image orientation so that the user could view the upright projected image. When the user needs to adjust the projected image orientation, the user may send a sound signal to the projection device. Optionally, the user may send the sound signal at any moment in a projection process of the projection device. For example, the user may send the sound signal to the projection device before the projection device projects the image to be projected onto the projection plane, and the user may also send the sound signal to the projection device after the projection device projects the image to be projected onto the projection plane.

The projection device may acquire the sound signal sent by the user in real time through a microphone array and perform locating to determine the positional relationship between the user and the projection device according to the sound signal sent by the user.

The microphone array is an array formed by arranging a group of omnidirectional microphones at different spatial positions according to a certain shape rule. According to the shape rule of the microphone array, it may be divided into a linear array, a planar array, a body array and the like. On such a basis, the microphone array includes a linear microphone array, a surface-shaped microphone array, a body-shaped microphone array and the like. The microphone array arranged according to any shape rule may be applied to the embodiment as long as the direction of the sound signal sent by the user may be determined. Optionally, the direction of the sound signal may be determined according to a time difference and/or an amplitude difference of the sound signals monitored by microphones on the microphone array, and the direction of the sound signal is determined as the direction of the user.

Optionally, content of the sound signal may be any content, i.e. the sound signal sent by the user including any content, may be acquired and determined by the microphone array. However, in an application scene, a sound signal sent by another person not viewing the projected image may exist, if the microphone array also acquires the sound signal and accordingly performs locating to determine the positional relationship between the user and the projection device, it is inappropriate. On such a basis, the content of the sound signal may optionally be set as a specified content, for example "please adjust", "please rotate", "project" and the like. On such a basis, the sound signal sent by the user is recognized by use of a voice recognition method, and when the sound signal is recognized as an audio signal including the specified content, the direction of the sound signal is determined according to the time difference and/or the amplitude difference of the monitored sound signals monitored by microphones on the microphone array, and the direction of the sound signal is determined as the direction of the user.

In combination with directions of the projection device and the user, the positional relationship between the user and the projection device is acquired, for example, the user is in front of the projection device or behind the projection device. After the positional relationship between the user and the projection device is determined, the projection device may further determine the projected image orientation meeting the viewing requirements of the user, i.e. a projected image orientation being consistent with the viewing direction of the user, according to the positional relationship. The projection device projects the image to be projected onto the projection plane according to the projected image orientation. For example, if the user is behind the projection device, the projection image orientation should be consistent with the viewing direction of the user behind the projection device, i.e. when the user behind the projection device views the projected image, the user will view an upright projected image.

In the embodiment, the sound signal sent by the user is acquired, and locating is automatically performed to determine the positional relationship between the user and the projection device according to the sound signal sent by the user; and the projected image orientation meeting the viewing requirements of the user is determined according to the positional relationship between the user and the projection device, and the image to be projected is projected onto the projection plane according to the projected image orientation, so that the projection device may automatically locate the user and automatically adjust the projected image orientation according to the position of the user to meet the viewing requirements of the user. The user may view an upright projected image meeting the viewing requirements only by sending the sound signal, so that convenience and friendliness for human-computer interaction are improved.

Figure 2A:
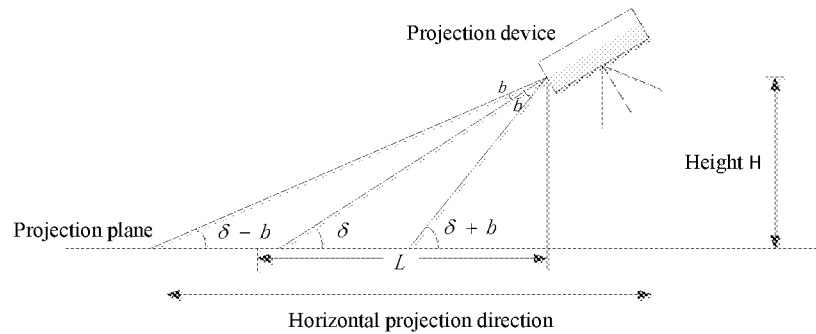
FIG. 2A is a front view of projection to a projection plane by projection device according to another embodiment of the disclosure.
Figure 2B:
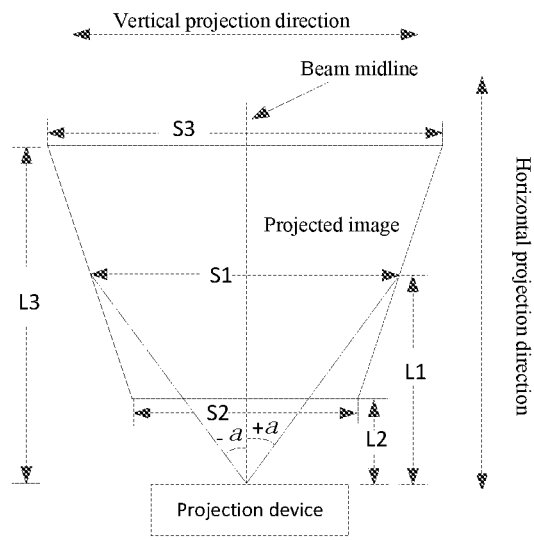
FIG. 2B is a top view of projection to a projection plane by projection device according to another embodiment of the disclosure.

In the above mentioned embodiment or the following embodiments, a shape of the image obtained by projecting onto the projection plane by use of the oblique projection technology is usually a trapezoid. For convenient description and distinction, in below, the image to be projected onto the projection plane in the projection device is called as the image to be projected, and the image formed by projecting the image to be projected onto the projection plane is called as the projected image. FIG. 2A is a front view of projection to a projection plane by projection device according to another embodiment of the disclosure. FIG. 2B is a top view of projection to a projection plane by projection device according to another embodiment of the disclosure. In below, the size of the projected image will be calculated in combination with FIG. 2A and FIG. 2B, in order to describe that the shape of the image obtained by projecting onto the projection plane by use of the oblique projection technology is a trapezoid.

As shown in FIG. 2A, a height between the projection device and the projection plane is H, an included angle between the beam midline direction of the projection device and the projection plane is $\delta$, i.e. an oblique angle of the projection device during oblique projection is $\delta$; and a field angle of the projection device in a horizontal projection direction is 2b. The field angle of the projection device in the horizontal projection direction is a physical parameter of the projection device. The field angle of the projection device in the horizontal projection direction is an included angle, which takes the projection device as the vertex and is formed by two projection beams of a maximum range in the horizontal projection direction in projection beams emitted by the projection device. Generally, in case that the beam midline direction of the projection device is vertical to the projection plane, when the projection device is located at a position opposite to an intersection of diagonals of the projected image (for example, over or in front), the projected image is usually rectangular, and an included angle of two line segments formed by the projection device and midpoints of any two opposite sides of the projected image is the field angle. In combination with FIG. 2A, it can be seen that the field angle of the projection device in the horizontal projection direction is an included angle between left and right dashed lines shown in FIG. 2A. During oblique projection, a range of a horizontal projection angle of the projection device on the projection plane is $(\delta-b)\sim(\delta+b)$, wherein the horizontal projection angle refers to an included angle, which is between a projection beam direction and the projection plane, in the horizontal projection direction in the projection plane. In the horizontal projection direction, a horizontal projection distance of the projected image relative to the projection device is set as L, and it can be obtained by geometric deduction that:

$$\cot(\delta+b)\cdot H \leq L \leq \cot(\delta-b)\cdot H \quad (1)$$

In combination with FIG. 2B, at a position where the horizontal projection angle is $\delta$, the horizontal projection distance of the projected image relative to the projection device is L1. The distance L1 may be obtained by geometric deduction according to the horizontal projection angle $\delta$ at the corresponding position and height H between the projection device and the projection plane, specifically as follows:

$$L1=\cot(\delta)\cdot H \quad (2)$$

As shown in FIG. 2B, at the position where the horizontal projection angle is $\delta$, a field angle of the projection device in a vertical projection direction is 2a. The field angle of the projection device in the vertical projection direction is also a physical parameter of the projection device. The field angle of the projection device in the vertical projection direction is an included angle, which takes the projection device as the vertex and is formed by two projection beams of a maximum range in the vertical projection direction in projection beams emitted by the projection device at the horizontal projection angle δ. In combination with FIG. 2B, it can be seen that the field angle of the projection device in the vertical projection direction is an included angle between left and right dashed lines shown in FIG. 2B. When the oblique angle of the projection device is δ, a range of a vertical projection angle on the projection plane is –a~a. The horizontal projection direction and the vertical projection direction are vertical to each other, and both parallel to the projection plane. The vertical projection angle refers to an included angle between the projection beam direction and the beam midline direction in the vertical projection direction in the projection plane at the position where the horizontal projection angle is δ. At the position where the horizontal projection angle is δ, a width S1 of the projected image may be obtained by geometric deduction according to the horizontal projection angle δ at the corresponding position, the height H between the projection device and the projection plane and a ½ field angle a of the projection device in the vertical projection direction, specifically as follows:

$$S1 = 2 \cdot \frac{H}{\sin(\delta)} \cdot \tan(a) \quad (3)$$

Similarly, at a position where the horizontal projection angle is δ+b, the horizontal projection distance of the projected image relative to the projection device is L2, and it can be obtained that L2 is:

$$L2 = \cot(\delta+b) \cdot H \quad (4)$$

Correspondingly, at the position where the horizontal projection angle is δ+b, a width S2 of the projected image may be obtained by geometric deduction according to the horizontal projection angle δ+b at the corresponding position, the height H between the projection device and the projection plane, the ½ field angle a of the projection device in the vertical projection direction and a ½ field angle b of the projection device in the horizontal projection direction, specifically as follows:

$$S2 = 2 \cdot \frac{H}{\sin(\delta + b)} \cdot \tan(a) \cdot \cos(b) \quad (5)$$

Similarly, at the position where the horizontal projection angle is δ−b, the horizontal projection distance of the projected image relative to the projection device is L3, and it can be obtained that L3 is:

$$L3 = \cot(\delta-b) \cdot H \quad (6)$$

Correspondingly, at the position where the horizontal projection angle is δ−b, it can be obtained that a width S3 of the projected image is:

$$S3 = 2 \cdot \frac{H}{\sin(\delta - b)} \cdot \tan(a) \cdot \cos(b). \quad (7)$$

According to the foregoing formula, it can be obtained that S2 is unequal to S3, and the shape of the projected image is a trapezoid. Since a shape of the image to be projected is usually a rectangle, and if the shape of the projected image is changed from a rectangle to a trapezoid after projected onto the projection plane, the picture and text in the projected image may be distorted, it is necessary to correct the trapezoidal projected image into a rectangular projected image. For convenient description and distinction, the trapezoidal projected image is called a trapezoidal image, and the rectangular projected image obtained by correcting the trapezoidal projected image is called a rectangular image.

In the embodiment, the trapezoidal image generated by the image to be projected may be corrected into the rectangular image before projection, and then the rectangular image is directly projected onto the projection plane; and the trapezoidal image on the projection plane may also be corrected into the rectangular image after projection. On such a basis, the image to be projected is projected onto the projection plane according to the projected image orientation, and the following two implementation modes are included.

The first implementation mode: during oblique projection, the projection device generates the trapezoidal image corresponding to the image to be projected. The trapezoidal image is not an image projected onto the projection plane, but a virtual image generated by the projection device according to its height relative to the projection plane, the range of the projection angle in the vertical projection direction and the range of the projection angle in the horizontal projection direction.

The projection device performs rectangle correction on the generated trapezoidal image to obtain the rectangular image, and projects the rectangular image onto the projection plane according to the projected image orientation to obtain the projected image of the image to be projected.

The second implementation mode: the projection device performs oblique projection on the image to be projected according to the projected image orientation to obtain the trapezoidal image projected onto the projection plane, and then performs rectangle correction on the trapezoidal image on the projection plane to obtain the projected image of the image to be projected.

In the first implementation mode and the second implementation mode, rectangle correction may be performed on the trapezoidal image in an optical keystone correction manner or by a digital keystone correction method. The optical keystone correction refers to regulating a physical position of a lens to achieve the purpose of performing rectangle correction on the trapezoidal image. And, the digital keystone correction refers to performing shape regulation and compensation on the trapezoidal image through a software interpolation algorithm to further obtain the rectangular image. It is important to note that the optical keystone correction and the digital keystone correction belong to the prior art and will not be elaborated herein.

Figure 2C:
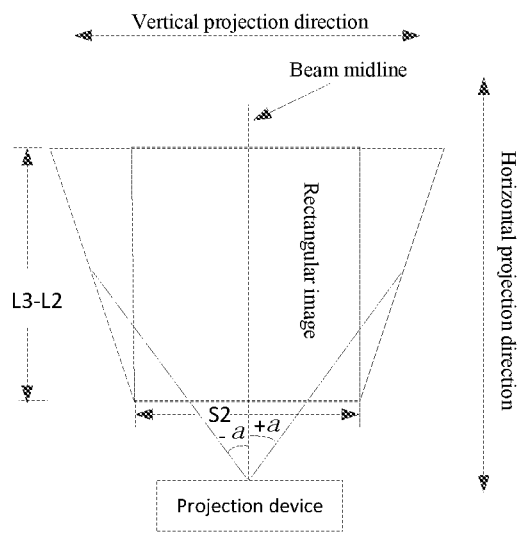
FIG. 2C is a schematic diagram of a rectangular image according to another embodiment of the disclosure.

After the trapezoidal image is corrected into the rectangular image through the first implementation mode or the second implementation mode, a rectangular image with the width S2 and a length L3–L2 may be obtained on the projection plane, as shown in FIG. 2C. L3–L2 may be obtained according to formula (4) and formula (6), specifically as follows:

$$L3-L2 = (\cot(\delta-b)-\cot(\delta+b)) \cdot H \quad (8)$$

Figure 3:
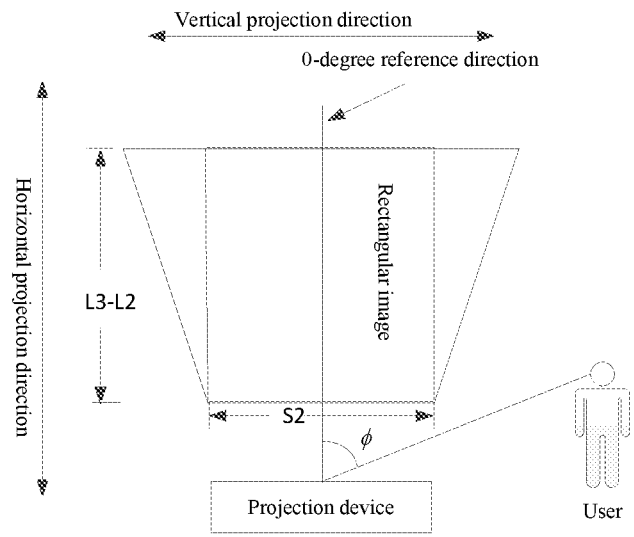
FIG. 3 is a schematic diagram of a direction angle according to another embodiment of the disclosure.

In the foregoing embodiment or the following embodiments, the positional relationship between the user and the projection device may be represented by an angle of a direction of a connecting line between the user and the projection device relative to a direction of a mapping midline of a beam midline emitted by the projection device on the projection plane. The mapping midline is a connecting line between the mapping point of the projection device on the projection plane and the center of the projected image, i.e. a projection line corresponding to the beam midline emitted by the projection device on the projection plane. For convenient calculation, as shown in FIG. 3, the direction of the mapping midline is set as a 0-degree reference direction of the sound signal. According to the foregoing embodiment, the direction of the sound signal, i.e. the direction of the user, may be determined according to the sound signal sent by the user, and a direction angle φ of the direction of the connecting line between the user and the projection device relative to the 0-degree reference direction is calculated in combination with the 0-degree reference direction, as shown in FIG. 3.

It is important to note that, in each embodiment of the disclosure, the connecting line between the user and the projection device refers to a connecting line between the user and the mapping point of the projection device on the projection plane, for simplified description, the connecting line is collectively referred to as the connecting line between the user and the projection device for short. Correspondingly, in the present application document, the connecting line between the user or a certain point and the projection device refers to a connecting line between the user or the point and the mapping point of the projection device on the projection plane. Similarly, for simplified description, the connecting line is collectively referred as the connecting line between the user or the point and the projection device for short. From FIG. 3 to FIG. 5E, it can be seen that each angle is an included angle between the connecting line, which is between the user or a certain point on a circle and the mapping point of the projection device on the projection plane, and the 0-degree reference direction, i.e. the simplified explanations to the foregoing descriptions may be supported from FIG. 3 to FIG. 5E.

According to the foregoing contents, the projected image orientation meeting the viewing requirements of the user may be further determined according to the positional relationship between the user and the projection device, i.e. the direction angle φ. Optionally, after the direction angle φ is calculated, a projected image orientation corresponding to an angle range to which the direction angle φ belongs is determined as the projected image orientation meeting the viewing requirements of the user according to the direction angle φ and a mapping relationship between an angle range and a projected image orientation. The mapping relationship between the angle range and the projected image orientation may be obtained by the following Step 1 to Step 5.

In Step 1, the center of the projected image and the length T of the diagonal of the projected image of the projection device on the projection plane are determined according to physical parameters of the projection device.

Physical parameters of the projection device comprise: the distance between the projection device and the projection plane, the horizontal projection angle range (δ−b)~(δ+b) of the projection device in the horizontal projection direction, the vertical projection angle range −a~a of the projection device in the vertical projection direction and the like. The length and width of the projected image may be obtained according to the above mentioned physical parameters of the projection device. Furthermore, the center of the projected image and the length T of the diagonal of the projected image may be determined according to the length and width of the projected image.

The projected image may be the trapezoidal image not subjected to rectangle correction and may also be the rectangular image obtained by rectangle correction. If the projected image is the trapezoidal image, the center of the projected image is an intersection of two diagonals of the trapezoid. In most cases, the projected image is the rectangle image obtained by rectangle correction, so that the center of the projected image is an intersection of two diagonals of the rectangle, and correspondingly, the length of the diagonal is the length T of the diagonal of the rectangle. The length T of the diagonal of the rectangle may be obtained by geometric deduction according to the horizontal projection angles δ+b and δ−b, the ½ field angle a of the projection device in the vertical projection direction and the ½ field angle b of the projection device in the horizontal projection direction, specifically as follows:

$$T = H \cdot \sqrt{(\cot(\delta - b)\cot(\delta + b))^2 + \left(2 \cdot \frac{\tan(a) \cdot \cos(b)}{\sin(\delta + b)}\right)^2} \quad (9)$$

Figure 4A:
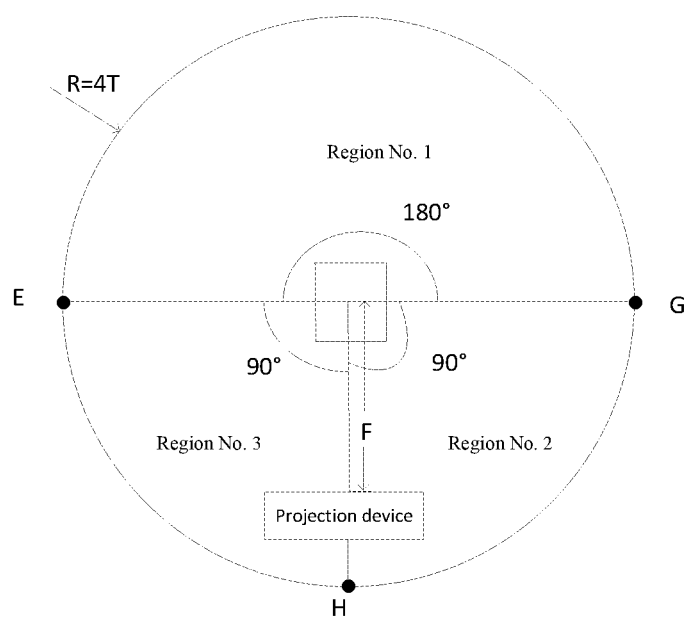
FIG. 4A is a schematic diagram of unevenly divided sector regions according to another embodiment of the disclosure.
Figure 5A:
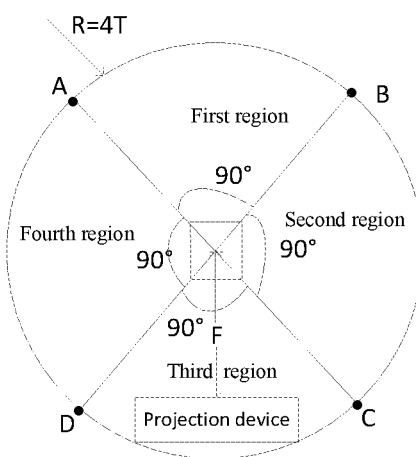
FIG. 5A is a schematic diagram of evenly divided sector regions according to another embodiment of the disclosure.

In Step 2, according to screen vision theory, the best projected image viewing effect may be achieved when the user is at a position at a distance four times the diagonal away from the center of the projected image, and the position is also a viewing position where the user most often is. As shown in FIG. 4A and FIG. 5A, a circle is determined on the projection plane by taking the center of the projected image as the center of the circle and taking a length 4 T as a radius.

In Step 3, as shown in FIG. 4A and FIG. 5A, the circle determined in Step 2 is divided into N sector regions, wherein each sector region corresponds to one projected image orientation, the sector region of which the corresponding projected image orientation is same as the projection device orientation is set as a reference region, and the projected image orientation corresponding to the reference region is set as a default projected image orientation. The projected image orientations corresponding to the sector regions refer to extending directions from the center of the circle to arcs corresponding to the sector regions.

Wherein, N≥2, optionally, the circle may be evenly divided into N sector regions, and may also be unevenly divided into N sector regions. For example, in FIG. 4A, the circle is unevenly divided into three sector regions, i.e. a Region No. 1, a Region No. 2 and a Region No. 3 respectively. For example, in FIG. 5A, the circle is evenly divided into four sector regions, i.e. a first region, a second region, a third region and a fourth region respectively. No matter which manner is adopted to divide the sector regions, each sector region corresponds to a projected image orientation. The projected image orientation corresponding to each sector region is consistent with the viewing direction of the user corresponding to the sector region.

In each sector region, the sector region of which the corresponding projected image orientation is same as the projection device orientation is set as the reference region. The projection device orientation refers to a beam emission direction of the projection device. For example, the Region No. 1 in FIG. 4A or the first region in FIG. 5A is set as the reference region. For subsequent convenient calculation, the projected image orientation corresponding to the first region is set as the default projected image orientation.

In Step 4, according to the length T of the diagonal of the projected image and the distance F between the center of the projected image and the mapping point of the projection device on the projection plane, included angles between directions of connecting lines between boundary points of each sector region on the circle and the projection device and the 0-degree reference direction are calculated to obtain N angle ranges.

One sector region has two boundary points on the circle, i.e. two intersections between two radiuses enclosing the sector region and a circular arc. The two intersections are connected with the projection device to obtain two connecting lines, and two included angles between the two connecting lines and the 0-degree reference direction form endpoints (critical values) of an angle range corresponding to the sector region.

For example, in FIG. 5A, a central angle of each sector region is 90°, a midline of the central angle of the reference region (the first region) is taken as a reference, i.e. the 0-degree reference direction, and included angles between the two radiuses of each region and the midline of the central angle of the first region are defined in clockwise. The included angles between the two radiuses of the first region and the midline of the central angle of the region are 315° and 45° respectively, and correspondingly, the boundary points of the first region on the circle are a point A at 315° and a point B at 45° respectively. The included angles between the two radiuses of the second region and the midline of the central angle of the first region are 45° and 135° respectively, and correspondingly, the boundary points of the second region on the circle are the point B at 45° and a point C at 135° respectively. The included angles between the two radiuses of the third region and the midline of the central angle of the first region are 135° and 225° respectively, and correspondingly, the boundary points of the third region on the circle are the point C at 135° and a point D at 225° respectively. The included angles between the two radiuses of the fourth region and the midline of the central angle of the first region are 225° and 315° respectively, and correspondingly, the boundary points of the fourth region on the circle are the point D at 225° and the point A at 315° respectively.

Figure 5B:
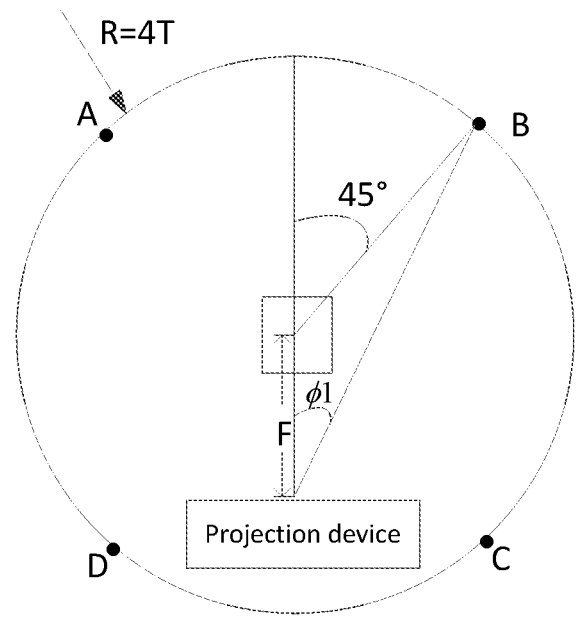
FIG. 5B is a schematic diagram of an included angle between a direction of a connecting line between a point B and the projection device and a direction of a mapping midline in FIG. 5A according to another embodiment of the disclosure.

As shown in FIG. 5B, the included angle between the connecting line between the point B and the projection device and the 0-degree reference direction is set as $\phi 1$, and $\phi 1$ may be obtained by geometric deduction according to the length T of the diagonal of the projected image and the distance F between the center of the projected image and the mapping point of the projection device on the projection plane, specifically as follows:

$$\phi 1 = \arctan\left(\frac{2\sqrt{2}\,T}{F + 2\sqrt{2}\,T}\right) \quad (10)$$

F is the distance between the center of the projected image and the mapping point of the projection device on the projection plane, the mapping point on the projection plane is an intersection between a vertical line penetrating through the projection plane of the projection device and the projection plane, and F may be obtained according to formula (4) and formula (6), specifically as follows:

$$F = (L3 + L2)/2 = (\cot(\delta - b) + \cot(\delta + b)) \cdot H2 \quad (11)$$

Figure 5C:
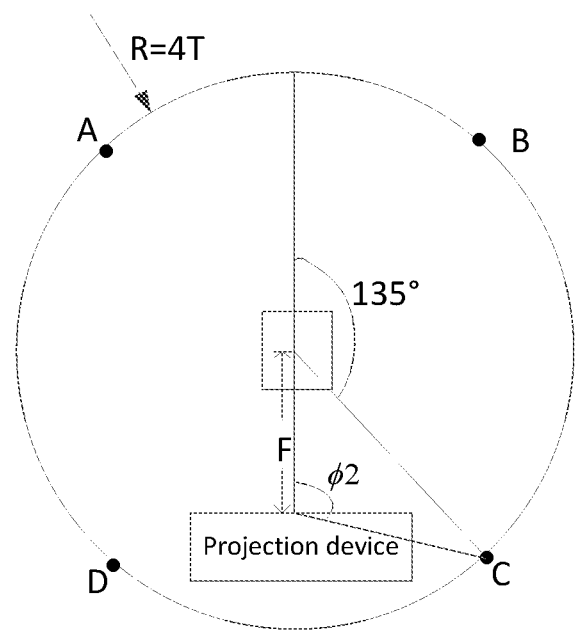
FIG. 5C is a schematic diagram of an included angle between a direction of a connecting line between a point C and the projection device and a direction of a mapping midline in FIG. 5A according to another embodiment of the disclosure.

As shown in FIG. 5C, the included angle between the connecting line between the point C and the projection device and the 0-degree reference direction is set as $\phi 2$, the calculation method of $\phi 2$ is similar to that of $\phi 1$, and it can be obtained that $\phi 2$ is:

$$\phi 2 = 180° - \arctan\left(\frac{2\sqrt{2}\,T}{2\sqrt{2}\,T - F}\right) \quad (12)$$

Figure 5D:
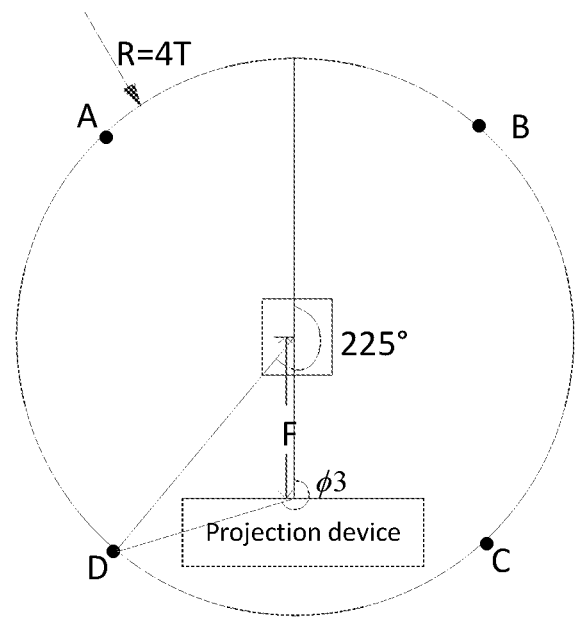
FIG. 5D is a schematic diagram of an included angle between a direction of a connecting line between a point D and the projection device and a direction of a mapping midline in FIG. 5A according to another embodiment of the disclosure.

As shown in FIG. 5D, the included angle between the connecting line between the point D and the projection device and the 0-degree reference direction is set as $\phi 3$, and it can be obtained that $\phi 3$ is:

$$\phi 3 = 180° - \arctan\left(\frac{2\sqrt{2}\,T}{2\sqrt{2}\,T - F}\right) \quad (13)$$

Figure 5E:
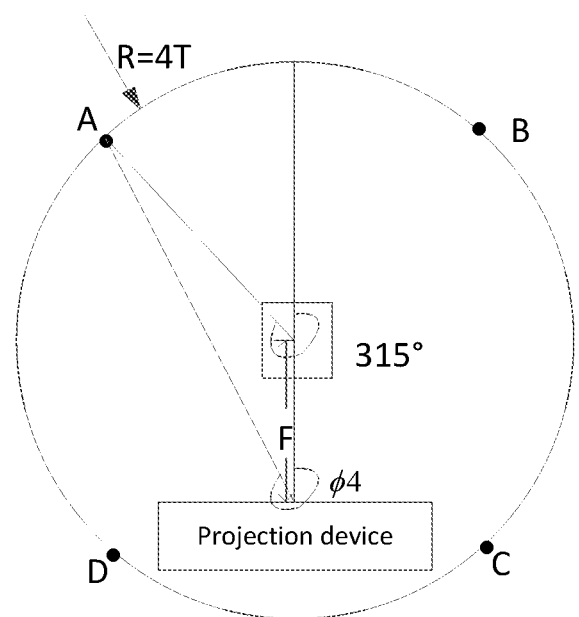
FIG. 5E is a schematic diagram of an included angle between a direction of a connecting line between a point A and the projection device and a direction of a mapping midline in FIG. 5A according to another embodiment of the disclosure.

As shown in FIG. 5E, the included angle between the connecting line between the point A and the projection device and the 0-degree reference direction is set as $\phi 4$, and it can be obtained that $\phi 4$ is:

$$\phi 4 = 360° - \arctan\left(\frac{2\sqrt{2}\,T}{F + 2\sqrt{2}\,T}\right) \quad (14)$$

The angle range corresponding to the first region may be obtained through the included angle between the direction of the connecting line of the point A and the projection device and the 0-degree reference direction and the included angle between the direction of the connecting line of the point B and the projection device and the 0-degree reference direction. Similarly, the angle range corresponding to the second region may be obtained through the included angle between the direction of the connecting line of the point B and the projection device and the 0-degree reference direction and the included angle between the direction of the connecting line of the point C and the projection device and the 0-degree reference direction. The angle range corresponding to the third region may be obtained through the included angle between the direction of the connecting line of the point C and the projection device and the 0-degree reference direction and the included angle between the direction of the connecting line of the point D and the projection device and the 0-degree reference direction. The angle range corresponding to the fourth region may be obtained through the included angle between the direction of the connecting line of the point D and the projection device and the 0-degree reference direction and the included angle between the direction of the connecting line of the point A and the projection device and the 0-degree reference direction. Therefore, according to $\phi 1$~$\phi 4$, the angle range ($\phi 4$,$\phi 1$) corresponding to the first region, the angle range ($\phi 1$,$\phi 2$) corresponding to the second region, the angle range ($\phi 2$,$\phi 3$) corresponding to the third region and the angle range ($\phi 3$,$\phi 4$) corresponding to the fourth region may be obtained.

For another example, in FIG. 4A, the central angle of the Region No. 1 is 180° and central angles of the Region No. 2 and the Region No. 3 are both 90°. The midline of the central angle of the reference region (i.e. the Region No. 1) is taken as a reference (the 0-degree reference direction), and included angles between the two radiuses of each region and the midline of the central angle of the Region No. 1 are defined in clockwise. The included angles between the two radiuses of the Region No. 1 and the midline of the central angle of the region are 270° and 90° respectively, and correspondingly, the boundary points of the Region No. 1 on the circle are a point E at 270° and a point G at 90° respectively. The included angles between the two radiuses of the Region No. 2 and the midline of the central angle of the Region No. 1 are 90° and 180° respectively, and correspondingly, the boundary points of the Region No. 2 on the circle are the point G at 90° and a point H at 180° respectively. The included angles between the two radiuses of the Region No. 3 and the midline of the central angle of the Region No. 1 are 180° and 270° respectively, and correspondingly, the boundary points of the Region No. 3 on the circle are the point H at 180° and the point E at 270° respectively.

Figure 4B:
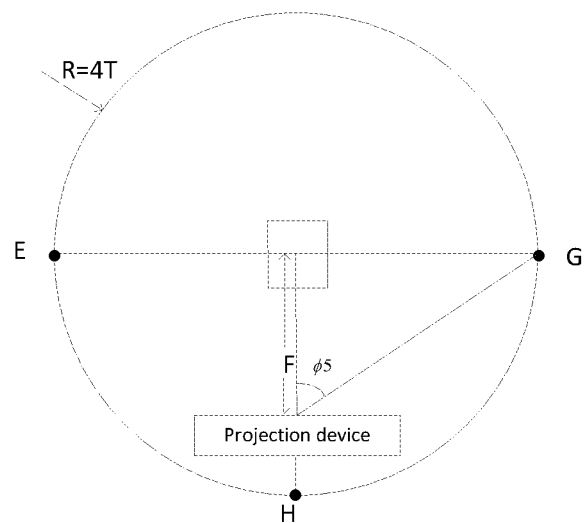
FIG. 4B is a schematic diagram of an included angle between a direction of a connecting line between a point G and the projection device and a direction of a mapping midline in FIG. 4A according to another embodiment of the disclosure.

The angle range of the Region No. 1 may be obtained through the included angle between the direction of the connecting line of the point E and the projection device and the 0-degree reference direction and the included angle between the direction of the connecting line of the point G and the projection device and the 0-degree reference direction. Similarly, the angle range corresponding to the Region No. 2 may be obtained through the included angle between the direction of the connecting line of the point H and the projection device and the 0-degree reference direction and the included angle between the direction of the connecting line of the point G and the projection device and the 0-degree reference direction. The angle range corresponding to the Region No. 3 may be obtained through the included angle between the direction of the connecting line of the point H and the projection device and the 0-degree reference direction and the included angle between the direction of the connecting line of the point E and the projection device and the 0-degree reference direction. As shown in FIG. 4B, the included angle between the connecting line between the point G and the projection device and the 0-degree reference direction is set as $\phi5$, and it can be obtained that $\phi5$ is:

$$\phi5 = \arctan\left(\frac{4T}{F}\right) \quad (15)$$

Figure 4C:
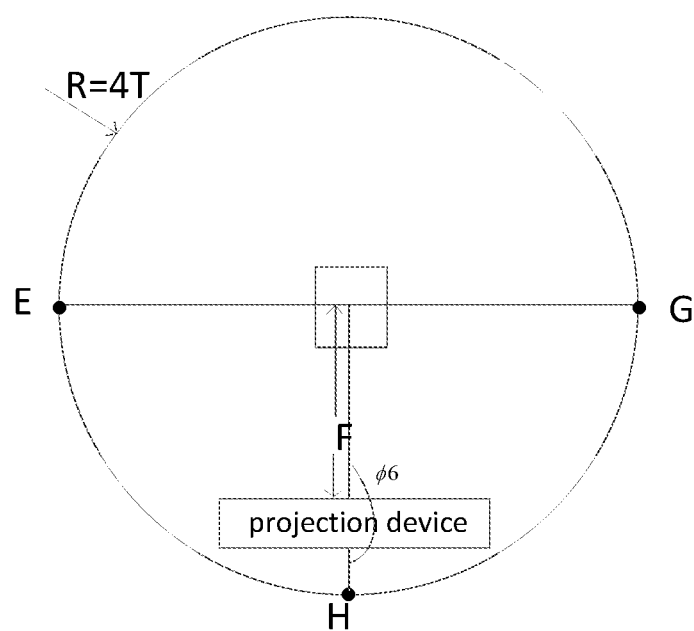
FIG. 4C is a schematic diagram of an included angle between a direction of a connecting line between a point H and the projection device and a direction of a mapping midline in FIG. 4A according to another embodiment of the disclosure.

As shown in FIG. 4C, the included angle between the connecting line between the point H and the projection device and the 0-degree reference direction is set as $\phi6$, and it can be obtained that $\phi6$ is:

$$\phi6 = 180° \quad (16)$$

Figure 4D:
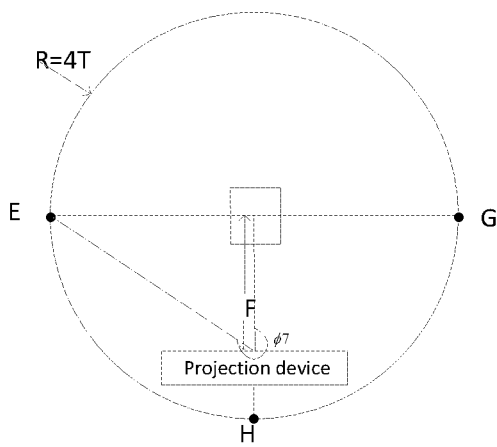
FIG. 4D is a schematic diagram of an included angle between a direction of a connecting line between a point E and the projection device and a direction of a mapping midline in FIG. 4A according to another embodiment of the disclosure.

As shown in FIG. 4D, the included angle between the connecting line between the point E and the projection device and the 0-degree reference direction is set as $\phi7$, and it can be obtained that $\phi7$ is:

$$\phi7 = 360° - \arctan\left(\frac{4T}{F}\right) \quad (17)$$

According to the above mentioned $\phi5 \sim \phi7$, the angle range ($\phi7,\phi5$) corresponding to the Region No. 1, the angle range ($\phi5,\phi6$) corresponding to the Region No. 2 and the angle range ($\phi6,\phi7$) corresponding to the Region No. 3 may be obtained.

It is important to note that, since different division manners are adopted for the sector regions, calculation formulas for the angle ranges corresponding to the sector regions are different, and the foregoing formulas are only applied to the division manners shown in FIG. 4A and FIG. 5A respectively. For another division manner, those skilled in the art may deduce the angle range corresponding to each sector region by use of a trigonometric function according to F and T, which will not be elaborated herein.

In Step 5, according to the reference region, the default projected image orientation and the positional relationship among the N sector regions, the projected image orientations corresponding to the N angle ranges respectively are determined to form the mapping relationship between the angle ranges and the projected image orientations.

The positional relationship among the N sector regions may be represented by values of included angles between midlines of the N sector regions, and correspondingly, the projected image orientations corresponding to the N angle regions respectively may be determined according to the values of the included angles between the midlines, the reference region and the default projected image orientation. For example, in FIG. 4A, the Region No. 1 is set as the reference region, and the projected image orientation corresponding to the Region No. 1 is set as the default projected image orientation. The included angle between the midline of the Region No. 2 and the midline of the Region No. 1 is 135°, and the default projected image orientation is rotated by 135° in clockwise to obtain the projected image orientation corresponding to the Region No. 2. The included angle between the midline of the Region No. 3 and the midline of the Region No. 1 is 225°, and the default projected image orientation is rotated by 225° in clockwise to obtain the projected image orientation corresponding to the Region No. 3.

For another example, in FIG. 5A, the first region is set as the reference region, and the projected image orientation corresponding to the first region is set as the default projected image orientation. The included angle between the midline of the second region and the midline of the first region is 90°, and then the default projected image orientation is rotated by 90° in clockwise to obtain the projected image orientation corresponding to the second region. The included angle between the midline of the third region and the midline of the first region is 180°, and then the default projected image orientation is rotated by 180° in clockwise to obtain the projected image orientation corresponding to the third region. The included angle between the midline of the fourth region and the midline of the first region is 270°, and then the default projected image orientation is rotated by 270° in clockwise to obtain the projected image orientation corresponding to the fourth region.

The mapping relationship between the angle ranges and the projected image orientations may be obtained in combination with the angle range, obtained in Step 4, of each sector region and the obtained projected image orientation corresponding to each sector region.

After the mapping relationship between the angle ranges and the projected image orientations is obtained, according to the direction angle $\phi$ and the mapping relationship between the angle ranges and the projected image orientations, the projected image orientation corresponding to the angle range to which the direction angle $\phi$ belongs may be determined as the projected image orientation meeting the viewing requirements of the user.

After the direction angle $\phi$ is determined, the angle range to which the direction angle $\phi$ belongs may be determined from the angle range corresponding to each sector region. Furthermore, the projected image orientation corresponding to the angle range is determined as the projected image orientation meeting the viewing requirements of the user. The projection device may project the image to be projected onto the projection plane according to the determined projection device orientation meeting the viewing requirements of the user. For example, in FIG. 4A, the direction angle is 50°, and if the direction angle belongs to the angle range (φ5,φ6) corresponding to the Region No. 2, the projected image orientation corresponding to (φ5,φ6) is determined as the projected image orientation meeting the viewing requirements of the user. The projected image orientation corresponding to (φ5,φ6) is obtained by rotating the default projected image orientation by 135° in clockwise. On such a basis, in an optional embodiment, the projected image orientation may be determined by rotating the default projected image orientation. Optionally, rotating the default projected image orientation may be implemented by rotating the orientation of each pixel in the default projected image.

Optionally, when the direction angle φ belongs to the i-th angle range, it is determined that the projected image orientation meeting the viewing requirements of the user is obtained by rotating the default projected image orientation by an angle V in clockwise, and it can be obtained that V is:

$$V = 360° * (i-1) * \frac{w_i}{N} \quad (18)$$

wherein N is the total number of the angle ranges, i=1, 2, ..., N, N≥2, i and N are both natural numbers, and $w_i$ is a weight coefficient corresponding to the i-th angle range.

It is important to note that: for the case that the sector regions are obtained by equal division, $w_i$ is a fixed constant, for example, $w_i$ is 1; for the case that the sector regions are obtained by unequal division, $w_i$ may be calculated according to the value of the central angle of each sector region, the number of the sector regions and the parameter i; and under a specific sector region division case, $w_i$ is also a fixed value and may be a different constant.

For example, in FIG. 4A, the circle is unevenly divided into the Region No. 1, the Region No. 2 and the Region No. 3. The central angle of the Region No. 1 is 180°, the central angle of the Region No. 2 is 90° and the central angle of the Region No. 3 is 90°. When the direction angle belongs to the angle range corresponding to the Region No. 1, i.e. a first angle range, the default projected image orientation is kept unchanged, in this case, $w_1$ may have an arbitrary value. When the direction angle belongs to the angle range corresponding to the Region No. 2, i.e. a second angle range, the default projected image orientation needs to be rotated by $$\frac{180°}{2} + \frac{90°}{2},$$

i.e. 135°, in clockwise according to FIG. 4A. It is set that V=135, i=2 and N=3, and $w_2$=9/8 is obtained. When the direction angle belongs to the angle range corresponding to the Region No. 3, i.e. a third angle range, the default projected image orientation needs to be rotated by $$\frac{180°}{2} + 90° + \frac{90°}{2},$$

i.e. 225°, in clockwise according to FIG. 4A. It is set that V=135, i=2 and N=3, and $w_3$=15/16 is obtained. At this moment, the weight coefficient $w_i$ in formula (18) is obtained respectively. In a practical projection process, the i-th angle range to which the direction angle belongs may be determined according to the direction angle φ, and i, N and $w_i$ are further put into formula (18) to obtain the angle by which the default projected image orientation needs to be rotated in clockwise.

For example, in FIG. 4A, the direction angle φ=50° and belongs to the second angle range, i=2, N=3 and $w_2$=9/8 are put into Formula (18) to obtain that the angle, by which the default projected image orientation needs to be rotated in clockwise, is 135°. For another example, in FIG. 4A, the direction angle φ=100° and belongs to the third angle range, i=2, N=3 and $w_3$=15/16 are put into formula (18) to obtain that the angle, by which the default projected image orientation needs to be rotated in clockwise, is 225°.

For the case that the sector regions are obtained by equal division, $w_i$ is 1. For example, in FIG. 5A, the direction angle φ=100° and is assumed to belong to the third angle range, i=3, N=4 and $w_3$=1 are put into formula (18) to obtain that the angle, by which the default projected image orientation needs to be rotated in clockwise, is 180°. For convenient understanding, when the direction angle belongs to different angle ranges, each parameter value in formula (17) and the angles, by which the default projected image orientation needs to be rotated in clockwise, are summarized in the following Table 1 and Table 2 respectively, wherein Table 1 corresponds to FIG. 4A and Table 2 corresponds to FIG. 5A.

TABLE 1

| i-th angle range | Parameter value | Angle rotated in anticlockwise |
|---|---|---|
| first angle range (φ7, φ5) | i = 1, N = 3 and $w_1$ arbitrary | 0° |
| second angle range (φ5, φ6) | i = 2, N = 3 and $w_2 = \frac{9}{8}$ | 135° |
| third angle range (φ6, φ7) | i = 2, N = 3 and $w_3 = \frac{15}{16}$ | 225° |

TABLE 2

| i-th angle range | Parameter value | Angle rotated in anticlockwise |
|---|---|---|
| first angle range (φ4, φ1) | i = 1, N = 4 and $w_1$ arbitrary | 0° |
| second angle range (φ1, φ2) | i = 2, N = 4 and $w_2$ = 1 | 90° |
| third angle range (φ2, φ3) | i = 3, N = 4 and $w_3$ = 1 | 180° |
| fourth angle range (φ3, φ4) | i = 4, N = 4 and $w_4$ = 1 | 270° |

In addition, some flow steps described in the foregoing embodiments and the accompanying drawings comprise multiple operations in a specific sequence. However, it should be clearly known that these operations may be not executed in the sequence recited in the disclosure or may be parallelly executed, and the sequence numbers of the operations, such as 201 and 202, do not represent any execution sequence but only distinguish each different operation. Moreover, these flow steps may comprise more or fewer operations and these operations may be executed sequentially or parallelly. It is necessary to note that descriptions such as "first" and "second" in the disclosure do not represent the sequence nor limit that the "first" and the "second" are different types, but are used to distinguish different messages, device, modules and the like.

Figure 6:
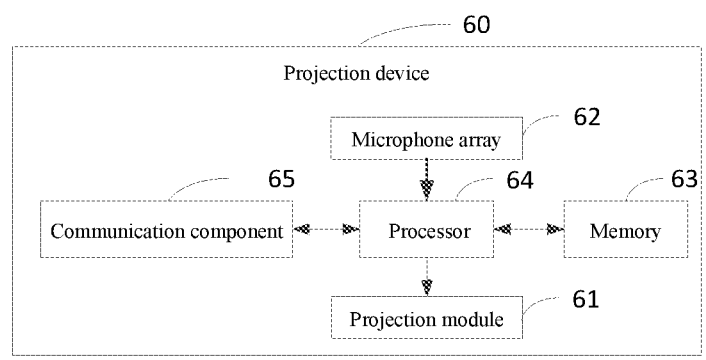
FIG. 6 is a structure diagram of a projection device according to another embodiment of the disclosure.

FIG. 6 is a structure diagram of projection device according to another embodiment of the disclosure. As shown in FIG. 6, the projection device 60 comprises a projection module 61, a microphone array 62, a memory 63 and a processor 64.

The microphone array 62 is configured to acquire a sound signal sent by a user, perform locating to determine a positional relationship between the user and the projection device 60 according to the sound signal sent by the user and output the positional relationship to the processor 64.

The memory 63 is configured to store a computer program, and may be configured to store various other types of data to support operations on the projection device. Examples of such data comprise instructions for any application program or method operated on the projection device, contact data, phonebook data, messages, pictures, videos, etc.

The memory 63 may be implemented by any type of volatile or non-volatile storage device or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory and a magnetic or optical disk.

The processor 64 is coupled to the memory 63 and the microphone array 62, and configured to execute the computer program stored in the memory 63 to: determine a projected image orientation meeting viewing requirements of the user according to the positional relationship, output by the microphone array 62, between the user and the projection device 60; and control the projection module 61 to project an image to be projected onto a projection plane according to the projected image orientation.

The projection module 61 is configured to project the image to be projected onto the projection plane according to the projected image orientation. Optionally, the projection module 61 includes, but is not limited to, components such as a lens, a slide, a light source, a projector lamp and a reflector.

In an optional embodiment, when performing locating to determine the positional relationship between the user and the projection device 60, the microphone array 62 is specifically configured to: set a direction of a mapping midline of a beam midline emitted by the projection device 60 on the projection plane as a 0-degree reference direction of the sound signal; and calculate a direction angle $\phi$ of the direction of the connecting line between the user and the projection device 60 relative to the 0-degree reference direction according to the sound signal sent by the user.

According to the foregoing contents, when determining the projected image orientation meeting the viewing requirements of the user, the processor 64 is configured to: determine a projected image orientation corresponding to an angle range, to which the direction angle $\phi$ belongs, to be the projected image orientation meeting the viewing requirements of the user according to the direction angle $\phi$ and a mapping relationship between the angle range and the projected image orientation.

In an optional embodiment, when determining the projected image orientation corresponding to the angle range, to which the direction angle $\phi$ belongs, to be the projected image orientation meeting the viewing requirements of the user according to the direction angle $\phi$ and the mapping relationship between the angle ranges and the projected image orientations, the processor 64 is specifically configured to: when the direction angle $\phi$ belongs to the i-th angle range, determine that the projected image orientation meeting the viewing requirements of the user is obtained by rotating a default projected image orientation by $$360° * (i-1) * \frac{w_i}{N}$$

in clockwise, wherein N is the total number of the angle ranges, i=1, 2, ..., N ≥ 2, i and N are both natural numbers, and $w_i$ is a weight coefficient corresponding to the i-th angle range.

In an optional embodiment, before determining the projected image orientation corresponding to the angle range, to which the direction angle $\phi$ belongs, to be the projected image orientation meeting the viewing requirements of the user according to the direction angle $\phi$ and the mapping relationship between the angle ranges and the projected image orientations, the processor 64 is further configured to:

determine the center of the projected image and the length T of a diagonal of the projected image of the projection device on the projection plane according to physical parameters of the projection device; determine a circle on the projection plane according to screen vision theory, the circle taking the center of the projected image as the center of the circle and taking a length 4 T as a radius; divide the circle into N sector regions, each sector region corresponds to one projected image orientation, set the sector region, of which the corresponding projected image orientation is same as a projection device orientation, as the reference region and set the projected image orientation corresponding to the reference region as the default projected image orientation; calculate included angles between directions of connecting lines between boundary points of each sector region on the circle and the projection device and the 0-degree reference direction according to the length T of the diagonal of the projected image and the distance F between the center of the projected image and the mapping point of the projection device on the projection plane to obtain N angle ranges; and determine projected image orientations corresponding to the N angle ranges respectively, according to the reference region, the default projected image orientation and a positional relationship among the N sector regions, to form the mapping relationship between the angle ranges and the projected image orientations.

In an optional embodiment, when dividing the circle into the N sector regions, the processor 64 is specifically configured to: evenly divide the circle into four sector regions. On such a basis, when determining the projected image orientation corresponding to the angle range, to which the direction angle $\phi$ belongs, to be the projected image orientation meeting the viewing requirements of the user according to the direction angle $\phi$ and the mapping relationship between the angle ranges and the projected image orientations, the processor 64 is specifically configured to: when the direction angle $\phi$ belongs to the i-th angle range, determine that the projected image orientation meeting the viewing requirements of the user is obtained by rotating the default projected image orientation by $$360° * (i-1) * \frac{w_i}{N}$$

in clockwise, wherein N=4, and i is a natural number.

In an optional embodiment, when controlling the projection module 61 to project the image to be projected onto the projection plane according to the projected image orientation, the processor 64 is specifically configured to execute any one of the following two operations:

the first operation: generating a trapezoidal image corresponding to the image to be projected during oblique projection; performing rectangle correction on the trapezoidal image to obtain a rectangular image; and controlling the projection module 61 to project the rectangular image onto the projection plane according to the projected image orientation to obtain the projected image of the image to be projected.

the second operation: controlling the projection module 61 to perform oblique projection on the image to be projected according to the projected image orientation to obtain the trapezoidal image projected onto the projection plane; and performing rectangle correction on the trapezoidal image on the projection plane to obtain the projected image of the image to be projected.

In an optional embodiment, the direction of the central axis of the microphone array 62 is consistent with the 0-degree reference direction. The direction, determined by the microphone array 62, of the sound signal may be represented by the included angle between the direction of the sound signal and the direction of the central axis of the microphone array. Since the direction of the central axis of the microphone array 62 is consistent with the 0-degree reference direction, the direction, determined by the microphone array 62, of the sound signal is the direction angle φ of the direction of the connecting line between the user and the projection device 60 relative to the 0-degree reference direction. Therefore, in the embodiment, the direction, determined by the microphone array 62, of the sound signal may be directly determined as the direction angle φ.

Furthermore, as shown in FIG. 6, the projection device 60 further comprises a communication component 65. On such a basis, before acquiring the sound signal sent by the user, the processor 64 is further configured to receive the projected image from terminal device through the communication component 65. The communication component 65 is configured to facilitate the wired or wireless communications between the projection device 60 and the terminal device. The projection device may access a communication-standard-based wireless network, for example, Wireless Fidelity (WiFi), 2nd-Generation (2G), 3rd-Generation (3G) or a combination thereof. In an exemplary embodiment, the communication component receives a broadcast signal or broadcast associated information from an external broadcast management system through a broadcast channel. In an exemplary embodiment, the communication component further includes a Near Field Communication (NFC) module to facilitate short-range communications. For example, the NFC module may be implemented on the basis of a Radio Frequency Identification (RFID) technology, an Infrared Data Association (IrDA) technology, an Ultra-Wideband (UWB) technology, a Bluetooth (BT) technology and other technologies.

Furthermore, the projection device 60 further includes another component, such as a power component and the like. Some of the components are only schematically shown in FIG. 6, and it does not mean that the projection device only comprises the components shown in FIG. 6.

The power component provides power to various components of the projection device 60, for example the projection module 61, the microphone array 62, the memory 63, the processor 64 and the communication component 65. The power component may comprise a power management system, one or more power supplies and any other component associated with generation, management and distribution of the power in the projection device 60.

In the embodiment of the disclosure, the sound signal sent by the user is acquired, and locating is automatically performed to determine the positional relationship between the user and the projection device according to the sound signal sent by the user; and the projected image orientation meeting the viewing requirements of the user is determined according to the positional relationship between the user and the projection device, and the image to be projected is projected onto the projection plane according to the projected image orientation, so that the projection device may automatically locate the user and automatically adjust the projected image orientation according to the position of the user to meet the viewing requirements of the user. The user may view an upright projected image meeting the viewing requirements only by sending the sound signal, so that convenience and friendliness for human-computer interaction are improved.

Correspondingly, an embodiment of the disclosure further provides a computer-readable storage medium for storing a computer program, when the computer program is executed, each step in the method embodiment executed by projection device in the foregoing method embodiment may be implemented.

Those skilled in the art should know that the embodiments of the disclosure may be provided as a method, a system or a computer program product. Therefore, the disclosure may take the form of an pure hardware embodiment, an pure software embodiment and an embodiment combining software and hardware. Moreover, the disclosure may take the form of a computer program product implemented on one or more computer usable storage mediums (including, but not being limited to, a disk storage, a Compact Disc Read-Only Memory (CD-ROM), an optical memory and the like) containing computer usable program codes. The disclosure is described with reference to flowcharts and/or block diagrams of the method, the device (system) and the computer program product according to the embodiments of the disclosure. It should be understood that each flow and/or block in the flowcharts and/or the block diagrams, and combinations of the flows and/or blocks in the flowcharts and/or the block diagrams may be implemented by computer program instructions. These computer program instructions may be provided to a processor of a universal computer, of a special purpose computer, of an embedded processor or of other programmable data processing device to generate a machine, so that a device for archiving the functions specified in one or more flow step of the flowcharts and/or one or more blocks of the block diagrams is generated by the instructions executed through the processor of the computer or of the other programmable data processing device.

These computer program instructions may also be stored in a computer-readable memory capable of directing the computer or the other programmable data processing device to operate in a specific manner, so that an article of manufacture comprising the command device may be generated by the instructions stored in the computer-readable memory, the command device archives the functions specified in one or more flow steps of the flowcharts and/or one or more blocks in the block diagrams.

These computer program instructions may further be loaded to a computer or other programmable data processing device, so that a series of operating steps are performed on the computer or the other programmable data processing device to generate a computer implemented processes, and steps for archiving the functions specified in one or more flow steps of the flowcharts and/or one or more blocks in the block diagrams are provided by the instructions executed on the computer or the other programmable data processing device.

In a typical configuration, the computing device comprises one or more Central Processing Units (CPUs), input/output interfaces, network interfaces and memories.

The memory may include a volatile memory, a Random Access Memory (RAM) and/or a nonvolatile memory, such as a Read Only Memory (ROM) or a flash memory (flash RAM), in a computer-readable medium. The memory is an example of the computer-readable medium. The computer-readable medium comprises permanent, non-permanent, removeable and non-removable medium, and information storage may be implemented by any method or technology. The information may be a computer-readable instruction, a data structure, module of an application program or other data. Example of a computer storage medium comprises, but not is limited to, a Phase Change Random Access Memory (PRAM), a Static Random Access Memory (SRAM), a Dynamic Random Access Memory (DRAM), other type of Random Access Memory (RAM), a Read-Only Memory (ROM), an Electrically Erasable Programmable Read Only Memory (EEPROM), a flash memory or other memory technology, a CD-ROM, a Digital Video Disk (DVD) or other optical storage device, a magnetic tape cartridge, tape magnetic disk storage or other magnetic storage device or any other non-transmission medium, and this storage medium may be configured to store information that may be accessed by a computing device. As defined herein, the computer-readable medium does not include transitory medium, such as modulated data signal and carrier wave.

It is also necessary to note that terms "include", "comprise" or any other variations thereof are intended to cover non-exclusive inclusions, so that processes, methods, articles or devices including a series of elements not only include those elements but also include other elements that are not explicitly listed, or include the elements that are inherent to such processes, methods, articles or devices. In the case of no more limitation, the element defined by the sentence "comprises a/an . . . " does not exclude the existence of another identical element in the processes, methods, articles or devices comprising such element. The above description is only the illustrative example of the disclosure and is not intended to limit the protection scope of the disclosure. For those skilled in the art, the disclosure may have various modifications and variations. Any modifications, equivalent replacements, improvements and the like made within the spirit and principle of the disclosure shall fall within the scope of the claims of the disclosure.

The invention claimed is:

1. A projection method, applicable to projection device, comprising:
acquiring a sound signal sent by a user;
performing locating to determine a positional relationship between the user and the projection device according to the sound signal sent by the user;
determining a projected image orientation meeting viewing requirements of the user according to the positional relationship between the user and the projection device; and
projecting an image to be projected onto a projection plane according to the projected image orientation;
wherein projecting an image to be projected onto a projection plane according to the projected image orientation comprises:
generating a trapezoidal image corresponding to the image to be projected during oblique projection;
performing rectangle correction on the trapezoidal image to obtain a rectangular image;
projecting the rectangular image onto the projection plane according to the projected image orientation to obtain the projected image of the image to be projected; or
performing oblique projection on the image to be projected according to the projected image orientation to obtain the trapezoidal image projected onto the projection plane; and
performing rectangle correction on the trapezoidal image on the projection plane to obtain the projected image of the image to be projected.

2. The projection method of claim 1, wherein:
performing locating to determine a positional relationship between the user and the projection device according to the sound signal sent by the user comprises:
setting a direction of a mapping midline of a beam midline emitted by the projection device on the projection plane as a 0-degree reference direction of the sound signal, and
calculating a direction angle $\phi$ of a direction of a connecting line between the user and the projection device relative to the 0-degree reference direction according to the sound signal sent by the user; and
determining a projected image orientation meeting viewing requirements of the user according to the positional relationship between the user and the projection device comprises:
determining a projected image orientation corresponding to an angle range, to which the direction angle $\phi$ belongs, to be the projected image orientation meeting the viewing requirements of the user according to the direction angle $\phi$ and a mapping relationship between the angle range and the projected image orientation.

3. The projection method of claim 2, wherein determining a projected image orientation corresponding to an angle range, to which the direction angle $\phi$ belongs, to be the projected image orientation meeting the viewing requirements of the user according to the direction angle $\phi$ and a mapping relationship between the angle range and the projected image orientation comprises:
when the direction angle $\phi$ belongs to the i-th angle range, determining that the projected image orientation meeting the viewing requirements of the user is obtained by rotating a default projected image orientation by $$360° * (i-1) * \frac{w_i}{N}$$

in clockwise,
wherein N is the total number of the angle ranges, i=1, 2, . . . , N, N≥2, i and N are both natural numbers, and $w_i$ is a weight coefficient corresponding to the i-th angle range.

4. The projection method of claim 3, wherein prior to the step of determining a projected image orientation corresponding to an angle range, to which the direction angle φ belongs, to be the projected image orientation meeting the viewing requirements of the user according to the direction angle φ and a mapping relationship between the angle range and the projected image orientation, the method further comprises:
  determining a center of the projected image and a length T of a diagonal of the projected image of the projection device on the projection plane according to physical parameters of the projection device;
  determining a circle on the projection plane, the circle taking the center of the projected image as the center of the circle and taking a length 4T as a radius;
  dividing the circle into N sector regions, each sector region corresponding to one projected image orientation, setting the sector region, of which the corresponding projected image orientation is same as a projection device orientation, as a reference region, and setting the projected image orientation corresponding to the reference region as the default projected image orientation;
  calculating included angles between directions of connecting lines between boundary points of each sector region on the circle and the projection device and the 0-degree reference direction according to the length T of the diagonal of the projected image and a distance F between the center of the projected image and a mapping point of the projection device on the projection plane to obtain N angle ranges; and
  determining projected image orientations corresponding to the N angle ranges respectively according to the reference region, the default projected image orientation and a positional relationship among the N sector regions, to form the mapping relationship between the angle ranges and the projected image orientations.

5. The projection method of claim 4, wherein the step of dividing the circle into N sector regions comprises: evenly dividing the circle into four sector regions.

6. A projection device, comprising:
  a projection module,
  a microphone array,
  a memory, and
  a processor;
  wherein:
  the microphone array is configured to acquire a sound signal sent by a user, perform locating to determine a positional relationship between the user and the projection device according to the sound signal sent by the user, and output the positional relationship to the processor;
  the memory is configured to store a computer program; and
  the processor is coupled to the memory and the microphone array, and configured to execute the computer program to:
  determine a projected image orientation meeting viewing requirements of the user according to the positional relationship, output by the microphone array, between the user and the projection device; and
  control the projection module to project an image to be projected onto a projection plane according to the projected image orientation;
  wherein when projecting the image to be projected onto the projection plane according to the projected image orientation, the processor is specifically configured to:
  generate a trapezoidal image corresponding to the image to be projected during oblique projection;
  perform rectangle correction on the trapezoidal image to obtain a rectangular image; and
  project the rectangular image onto the projection plane according to the projected image orientation to obtain the projected image of the image to be projected; or
  perform oblique projection on the image to be projected according to the projected image orientation to obtain the trapezoidal image projected onto the projection plane; and
  perform rectangle correction on the trapezoidal image on the projection plane to obtain the projected image of the image to be projected.

7. The projection device of claim 6, wherein:
  when performing locating to determine a positional relationship between the user and the projection device, the microphone array is specifically configured to:
  set a direction of a mapping midline of a beam midline emitted by the projection device on the projection plane as a 0-degree reference direction of the sound signal; and
  calculate a direction angle φ of a direction of a connecting line between the user and the projection device relative to the 0-degree reference direction according to the sound signal sent by the user; and
  when determining a projected image orientation meeting the viewing requirements of the user, the processor is configured to:
  determine the projected image orientation corresponding to an angle range, to which the direction angle φ belongs, to be the projected image orientation meeting the viewing requirements of the user according to the direction angle φ and a mapping relationship between the angle range and the projected image orientation.

8. The projection device of claim 7, wherein when determining the projected image orientation corresponding to an angle range, to which the direction angle φ belongs, to be the projected image orientation meeting the viewing requirements of the user, the processor is specifically configured to:
  when the direction angle φ belongs to the i-th angle range, determine that the projected image orientation meeting the viewing requirements of the user is obtained by rotating a default projected image orientation by $$360° * (i-1) * \frac{w_i}{N}$$

in clockwise,
  wherein N is the total number of the angle ranges, i=1, 2, ..., N, N≥2, i and N are both natural numbers; and $w_i$ is a weight coefficient corresponding to the i-th angle range.

9. The projection device of claim 8, wherein the processor is further configured to:
  determine a center of the projected image and a length T of a diagonal of the projected image of the projection device on the projection plane according to physical parameters of the projection device;
  determine a circle on the projection plane, the circle taking the center of the projected image as the center of the circle and taking a length 4T as a radius;
  divide the circle into N sector regions, each sector region corresponding to one projected image orientation, set the sector region, of which the corresponding projected image orientation is same as a projection device orientation, as a reference region and set the projected image orientation corresponding to the reference region as the default projected image orientation;

calculate included angles between directions of connecting lines between boundary points of each sector region on the circle and the projection device and the 0-degree reference direction according to the length T of the diagonal of the projected image and a distance F between the center of the projected image and a mapping point of the projection device on the projection plane to obtain N angle ranges; and determine projected image orientations corresponding to the N angle ranges respectively according to the reference region, the default projected image orientation and a positional relationship among the N sector regions, to form the mapping relationship between the angle ranges and the projected image orientations.

10. The projection device of claim 9, wherein when dividing the circle into the N sector regions, the processor is specifically configured to:
evenly divide the circle into four sector regions.

11. The projection device of claim 7, wherein a direction of a central axis of the microphone array is consistent with the 0-degree reference direction.

12. A non-transitory computer-readable storage medium storing a computer program, wherein when the computer program is executed, a method can be implemented, the method comprising:
acquiring a sound signal sent by a user;
performing locating to determine a positional relationship between the user and the projection device according to the sound signal sent by the user;
determining a projected image orientation meeting viewing requirements of the user according to the positional relationship between the user and the projection device; and
projecting an image to be projected onto a projection plane according to the projected image orientation;
wherein projecting an image to be projected onto a projection plane according to the projected image orientation comprises:
generating a trapezoidal image corresponding to the image to be projected during oblique projection;
performing rectangle correction on the trapezoidal image to obtain a rectangular image;
projecting the rectangular image onto the projection plane according to the projected image orientation to obtain the projected image of the image to be projected; or
performing oblique projection on the image to be projected according to the projected image orientation to obtain the trapezoidal image projected onto the projection plane; and
performing rectangle correction on the trapezoidal image on the projection plane to obtain the projected image of the image to be projected.

13. The non-transitory computer-readable storage medium of claim 12, wherein:
performing locating to determine a positional relationship between the user and the projection device according to the sound signal sent by the user comprises:
setting a direction of a mapping midline of a beam midline emitted by the projection device on the projection plane as a 0-degree reference direction of the sound signal, and
calculating a direction angle $\phi$ of a direction of a connecting line between the user and the projection device relative to the 0-degree reference direction according to the sound signal sent by the user; and
determining a projected image orientation meeting viewing requirements of the user according to the positional relationship between the user and the projection device comprises:
determining a projected image orientation corresponding to an angle range, to which the direction angle $\phi$ belongs, to be the projected image orientation meeting the viewing requirements of the user according to the direction angle $\phi$ and a mapping relationship between the angle range and the projected image orientation.

14. The non-transitory computer-readable storage medium of claim 13, wherein determining a projected image orientation corresponding to an angle range, to which the direction angle $\phi$ belongs, to be the projected image orientation meeting the viewing requirements of the user according to the direction angle $\phi$ and a mapping relationship between the angle range and the projected image orientation comprises:
when the direction angle $\phi$ belongs to the i-th angle range, determining that the projected image orientation meeting the viewing requirements of the user is obtained by rotating a default projected image orientation by $$360° * (i-1) * \frac{w_i}{N}$$

in clockwise,
wherein N is the total number of the angle ranges, i=1, 2, ..., N, N≥2, i and N are both natural numbers, and $w_i$ is a weight coefficient corresponding to the i-th angle range.

15. The non-transitory computer-readable storage medium of claim 14, wherein prior to the step of determining a projected image orientation corresponding to an angle range, to which the direction angle $\phi$ belongs, to be the projected image orientation meeting the viewing requirements of the user according to the direction angle $\phi$ and a mapping relationship between the angle range and the projected image orientation, the method further comprises:
determining a center of the projected image and a length T of a diagonal of the projected image of the projection device on the projection plane according to physical parameters of the projection device;
determining a circle on the projection plane, the circle taking the center of the projected image as the center of the circle and taking a length 4T as a radius;
dividing the circle into N sector regions, each sector region corresponding to one projected image orientation, setting the sector region, of which the corresponding projected image orientation is same as a projection device orientation, as a reference region, and setting the projected image orientation corresponding to the reference region as the default projected image orientation;
calculating included angles between directions of connecting lines between boundary points of each sector region on the circle and the projection device and the 0-degree reference direction according to the length T of the diagonal of the projected image and a distance F between the center of the projected image and a mapping point of the projection device on the projection plane to obtain N angle ranges; and determining projected image orientations corresponding to the N angle ranges respectively according to the reference region, the default projected image orientation and a positional relationship among the N sector regions, to form the mapping relationship between the angle ranges and the projected image orientations.

16. The non-transitory computer-readable storage medium of claim 15, wherein the step of dividing the circle into N sector regions comprises: evenly dividing the circle into four sector regions.

* * * * *